United States Patent
Scharf et al.

(10) Patent No.: US 9,652,691 B2
(45) Date of Patent: May 16, 2017

(54) METHOD OF PREDICTING CROP YIELD LOSS DUE TO N-DEFICIENCY

(71) Applicants: Peter Clifton Scharf, Columbia, MO (US); Victoria Cacnio Hubbard, Columbia, MO (US)

(72) Inventors: Peter Clifton Scharf, Columbia, MO (US); Victoria Cacnio Hubbard, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 15/334,066

(22) Filed: Oct. 25, 2016

(65) Prior Publication Data

US 2017/0039449 A1 Feb. 9, 2017

Related U.S. Application Data

(60) Continuation-in-part of application No. 14/886,712, filed on Oct. 19, 2015, now Pat. No. 9,508,007, which is a continuation-in-part of application No. 13/959,144, filed on Aug. 5, 2013, now Pat. No. 9,195,891, which is a continuation-in-part of application No. 13/481,245, filed on May 25, 2012, now Pat. No. 8,520,891, which is a division of application No. 11/936,564, filed on Nov. 7, 2007, now Pat. No. 8,208,680.

(60) Provisional application No. 60/857,242, filed on Nov. 7, 2006.

(51) Int. Cl.
*G06K 9/00* (2006.01)
*G06K 9/62* (2006.01)
*G06T 7/40* (2017.01)
*G06T 7/00* (2017.01)

(52) U.S. Cl.
CPC .......... *G06K 9/6212* (2013.01); *G06T 7/0004* (2013.01); *G06T 7/408* (2013.01); *G06T 2207/10032* (2013.01); *G06T 2207/30128* (2013.01)

(58) Field of Classification Search
None
See application file for complete search history.

(56) References Cited

U.S. PATENT DOCUMENTS 6,178,253 B1 * 1/2001 Hendrickson ......... G01J 3/2803
348/144

* cited by examiner

*Primary Examiner* — Atiba O Fitzpatrick
(74) *Attorney, Agent, or Firm* — Polsinelli PC

(57) ABSTRACT

A method for determining the yield loss of a crop using remote sensor data is described. The yield loss is determined using the reflectivity of light by the crop canopy measured from remote sensor data such as an aerial photograph. Pixel color values from the aerial photograph, expressed relative to pixel values from nitrogen-sufficient areas of the field, are transformed to yield losses using a transformation that was developed using empirical data. A similar method is described to determine recommended nitrogen fertilization rates for the crop fields. The yield loss data is useful for nitrogen fertilization management decisions, as it allows a producer of crops to weigh the expense of fertilization against the loss of revenue due to yield loss induced by nitrogen deficiency.

18 Claims, 12 Drawing Sheets

METHOD OF PREDICTING CROP YIELD LOSS DUE TO N-DEFICIENCY

CROSS-REFERENCE TO RELATED APPLICATION

This application is a Continuation-in-Part Application of Non-Provisional application Ser. No. 14/886,712 filed on Oct. 19, 2015, which is a Continuation-in-Part Application of Non-Provisional application Ser. No. 13/959,144 filed on Aug. 5, 2013, now U.S. Pat. No. 9,195,891, which is a Continuation-in-Part Application of Non-Provisional application Ser. No. 13/481,245 filed on May 25, 2012, now U.S. Pat. No. 8,520,891, which is a Divisional Application of Non-Provisional application Ser. No. 11/936,564 filed on Nov. 7, 2007, now U.S. Pat. No. 8,208,680, which claims priority from Provisional Application Ser. No. 60/857,242 filed on Nov. 7, 2006, all of which are hereby incorporated by reference in their entireties.

FUNDING OF RESEARCH

This work was supported by the U.S. Environmental Protection Agency contract number X-98756601-0. The U.S. government has certain rights in this invention.

FIELD

The present invention is directed generally to methods for determining the health and yield of a crop, using remote sensing data such as aerial photographs. In particular, the present invention provides a method of determining optimal nitrogen application rates as well as predicted losses in crop yield due to nitrogen deficiency.

BACKGROUND

Loss of nitrogen can result in economic loss in crop production systems due to nitrogen deficiency and yield limitation. Nitrogen is susceptible to loss from soils by a variety of mechanisms. The nitrate form of nitrogen is prone to loss by either leaching or denitrification when soils are wet. Nitrogen losses associated with wet soil conditions are common types of nitrogen loss from agricultural soils. The magnitude of nitrogen loss, and the process by which the nitrogen is lost, depends strongly on soil temperature and soil hydrology. Variations in soil temperature and hydrology within a field, due to differences in microclimate, can lead to substantial spatial variability in the amount of nitrogen that is lost within a given field.

When nitrogen loss occurs after the application of nitrogen fertilizer, a likely outcome, in the absence of any further intervention, is that the crop will suffer from nitrogen deficiency, resulting in substantial yield loss and subsequent economic loss. The yields of many crops, including corn, rice, wheat, and potatoes, dramatically increase in response to nitrogen applications throughout the vegetative stages of growth.

A traditional approach to avoiding losses in crop yield due to nitrogen deficiency is to apply an excess of nitrogen fertilizer at planting to compensate for anticipated nitrogen losses due to leaching or other mechanisms. An alternative and arguably more efficient approach to a single sizable application of nitrogen fertilizer near planting is the practice of applying a low nitrogen fertilizer rate at planting, which may be fully or partially corrected by an additional nitrogen application as needed in midseason. A corn producer, for example, may apply a low nitrogen rate near planting, and then apply additional nitrogen through a pivot irrigation system at growth stage V9 or later (Ritchie et al. 1993). Because the need for nitrogen is often spatially variable, accurate spatial diagnosis of nitrogen status can reduce the over-application of fertilizer, groundwater contamination, and can also increase nitrogen use efficiency, resulting in reduced operating costs. Thus, applying nitrogen to the growing crop, referred to in the art as rescue nitrogen application, is an effective way to respond to loss of fertilizer nitrogen.

Rescue nitrogen applications for corn and other crops are typically more expensive than primary nitrogen applications due to the height of the crops at the time the rescue nitrogen is applied, which usually create a need for specialized high-clearance equipment or aerial applications of nitrogen. The availability of equipment for high-clearance or aerial applications is often limited, meaning that it takes considerable effort on the part of a corn producer to arrange for these nitrogen applications. Balancing the cost and inconvenience of rescue nitrogen application against the economic impact of anticipated yield loss would help producers to make sound decisions about whether to proceed with rescue nitrogen applications.

Traditional technologies and methods for measuring leaching and denitrification losses of nitrogen are difficult, expensive, and slow, which limit a producer's ability to predict nitrogen loss and to utilize rescue nitrogen fertilization in order to minimize the potential yield loss for a particular field or section of a field. The soil may be periodically tested for nitrogen content at different depths and locations throughout the fields of a farm. Crop information may also be obtained using an apparatus in which the light with a wavelength related to crop nitrogen content is irradiated on a leaf blade of the crop and based on the reflectivity of the leaf at this wavelength of light; the leaf blade nitrogen content is measured with high precision. However, each of these techniques of monitoring soil and crop nitrogen content are highly localized. In order to determine the crop information accurately for the overall field, as well as to obtain an accurate mapping of the spatial variation of the crop information, numerous repeats of the minute measurements described above are required. Obtaining crop information in this manner is time-consuming, labor intensive, expensive, and may not supply the information in time for the farmer to apply rescue nitrogen effectively.

The increasing availability of commercial remote-sensing services tailored to the needs of agriculture offers new opportunities to develop and improve rescue nitrogen management strategies. Several studies have evaluated remote sensing techniques to determine corn nitrogen status during the growing season and have determined that the reflectance of corn across all visible and near-infrared wavelengths is correlated with leaf nitrogen concentration or other variables related to crop nitrogen status, and therefore can be used to detect nitrogen deficiencies in the crop canopy. Particularly, nitrogen-deficient corn reflects more visible light, and usually less near-infrared light, than nitrogen-sufficient corn, which suggests that light reflectance can be quantitatively related to the amount of nitrogen stress experienced by the crop.

The specific relationship between crop reflectivity and nitrogen status has been developed to some extent, but no specific or general relationships for predicting nitrogen loss or yield loss from remotely sensed data have been developed. To date, this relationship has been determined by adding increasing quantities of nitrogen to a system that is nitrogen-limited. For application to nitrogen loss situations, it is more appropriate to define the relationship between color, nitrogen stress, and yield in the context of a fully fertilized crop that experiences a range of nitrogen losses. The resulting relationship between nitrogen stress (as measured by crop color) and yield loss most directly addresses the question that is most salient to the producer: does it make good business sense to apply rescue nitrogen fertilization to my nitrogen-stressed crops, or does the cost of fertilization outweigh the gain in crop yield?

Remote sensing using aerial and satellite photography as well as ground based sensors have been used to determine several parameters related to the successful cultivation of crops, including soil nutrient content, chlorophyll content of crop leaves, and nitrogen content of crop leaves. The factors measured using remote sensing are correlated with the overall health and nutrient status of the crops. In general, these methods rely on variations in the reflectivity of the soil or the crop canopy to selected wavelengths of light falling within the visible and the near-infrared spectrum. Higher crop nitrogen content is associated with decreased reflectivity of the leaves in the crop canopy to visible light. Although this decreased reflectance of nitrogen-rich plant leaves may be most pronounced within the green wavelengths of the visible light spectrum, the reflectance of nitrogen-rich plant leaves in other colors such as blue or red may also be significantly correlated to crop health.

Most cameras used for the remote sensing of crops record a three-band spectral image combining either the near infrared, red, and green wavelengths or the red, green, and blue wavelengths. Remote sensing methodologies used for the determination of crop nitrogen status generally process the intensity of the colors contained in each pixel of a digital image of a field, and determines the variation in the intensity of each color.

Previous methods have used the relative greenness map to make determinations about the health of the crops, and in some cases claim the ability to determine nitrogen fertilization rate. However, optimizing the growth and harvest of the crops is only half of the information necessary for a producer to manage the growth and care of crops. When managing the production of crops, the producer must constantly weigh the cost of additional nitrogen fertilization against the potential increase in revenue from the sale of the additional crop yield. To date, current field management methodologies that utilize remote sensing lack the capability to determine the impact of variations in the health and nutritional status of crop plants on the crop yield.

At the present time, there exists an unmet need to determine the impact of crop nutrient status on the resulting crop yield using remote sensing technology such as aerial photographs. The results of this method would make it possible for the producer to manage the nitrogen supplementation of the crops informed by the economic impact of any nitrogen deficiency on crop yield.

SUMMARY

The present disclosure provides a method for determining a crop yield loss due to nitrogen deficiency in at least one or more crop fields based on an analysis of at least one or more remote sensing images. In this aspect, the method includes obtaining the one or more remote sensing images of the at least one or more crop fields, represented by pixels or polygons comprised of aggregated pixels, from the at least one or more remote sensing images. The method also includes selecting a color from the visible or near-infrared spectrum, or calculating a combination index value comprising at least two selected colors. A reference value for this color or index is selected that represents nitrogen-sufficient plants, either by finding the darkest plants in the field, the darkest plants in an appropriate neighboring field, or by measuring the value in a reference area in which a high rate of nitrogen fertilizer has been applied. In addition, the method includes calculating a relative color or index value of each pixel/polygon in the at least one or more remote sensing images by comparing the color or index value to the reference color or index value. Most commonly this may be done by dividing the color or index value by the reference color or index value, but may also be calculated by subtracting one value from the other (FIG. 10), or some other quantitative method of comparison. The relative color or index value is then used to estimate a yield loss of each pixel/polygon from an empirically-derived function of the relative index values (for example, as shown in FIGS. 4, 5, 7, 8, 9, and 10). The function used may be linear, polynomial, logarithmic, or some other function that can describe the type of data shown in FIGS. 4, 5, and 7-10 reasonably well.

Further provided herein is a method for determining a nitrogen fertilizer rate to alleviate crop nitrogen deficiency in one or more crop fields based on an analysis of one or more remote sensing images. The method includes obtaining the one or more remote sensing images of the one or more crop fields; calculating a color value for each pixel of the one or more remote sensing images or a polygon comprising an aggregation of pixels of the one or more remote sensing images, wherein the color value is an individual wavelength or a combination index value comprising at least two wavelengths; selecting a reference color value for the field that represents the color value of crop plants with sufficient nitrogen, to be the same wavelength or combination of wavelengths; calculating a relative color value of each pixel or polygon in the one or more remote sensing images by quantitatively comparing the color value from the pixel or polygon to the reference color value; estimating a nitrogen fertilizer rate of each pixel or polygon from its relative color value using an empirically determined mathematical relationship between the two quantities; and presenting a summary of all nitrogen rate estimates for the field. The relative color value and the reference value may be quantitatively compared by division, subtraction, or any other method of comparison. The summary of nitrogen rate estimates may be presented visually, as a rate control file, or numerically with averages, totals, or combinations of the nitrogen rate estimate of each pixel or polygon and may further include a comparison of the cost of the suggested nitrogen fertilizer treatment with the cost of the yield loss. The reference color value may obtained from the darkest areas in the one or more crop fields being diagnosed or from comparable nearby fields, such as the darkest plants in the field, the darkest plants in an appropriate neighboring field, measuring the value in a reference area in which a high rate of nitrogen fertilizer has been applied, or combinations thereof.

BRIEF DESCRIPTION OF THE DRAWINGS

The inventive method may be employed to predict crop (especially corn) yield loss for nitrogen-deficiency due to low nitrogen fertilization rate at planting but no nitrogen loss in mid-season ("nitrogen-stress-no-nitrogen-loss"), or due to nitrogen loss caused by wet weather or other factors following sufficient nitrogen fertilization early in the season ("nitrogen-loss").

Corresponding reference characters and labels indicate corresponding elements among the views of the drawings. The headings used in the figures should not be interpreted to limit the scope of the claims.

DETAILED DESCRIPTION

Figure 1:
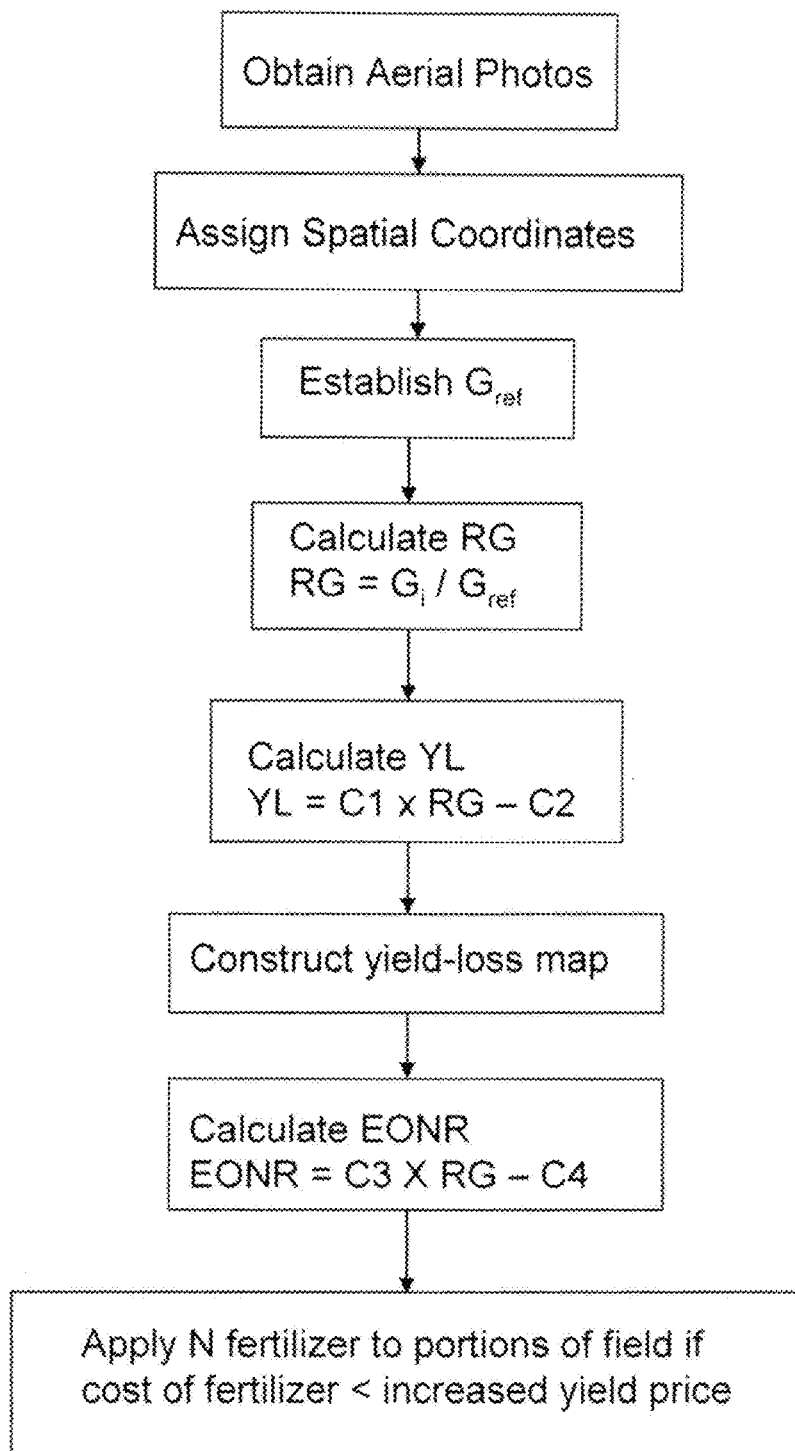
FIG. 1 is a flowchart illustration of one embodiment of the inventive method.
Figure 2:
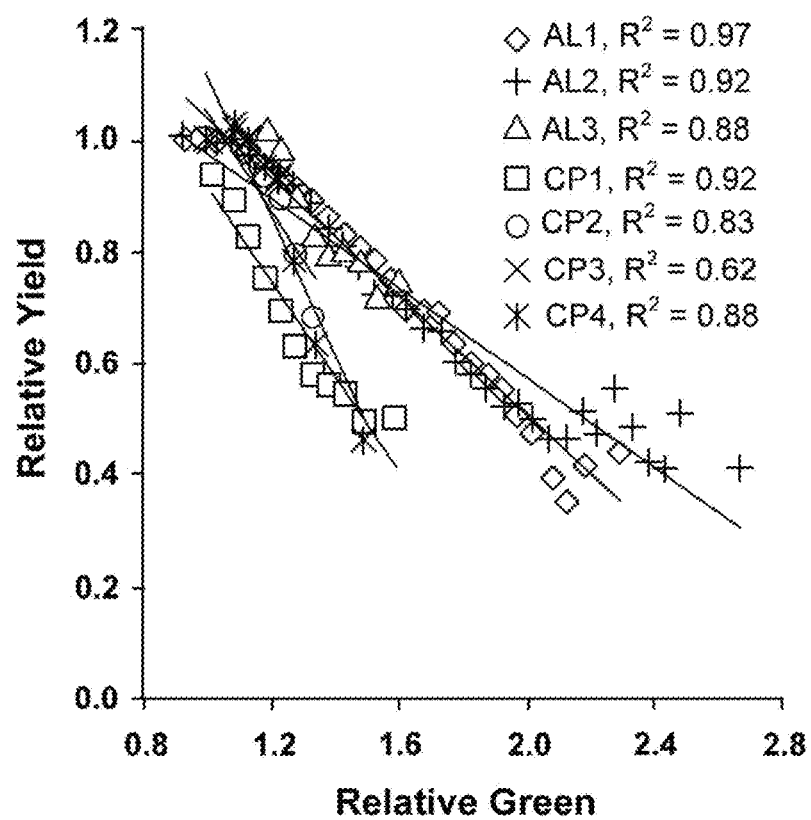
FIG. 2 illustrates the relationship between relative yield and relative green from individual fields.
Figure 3:
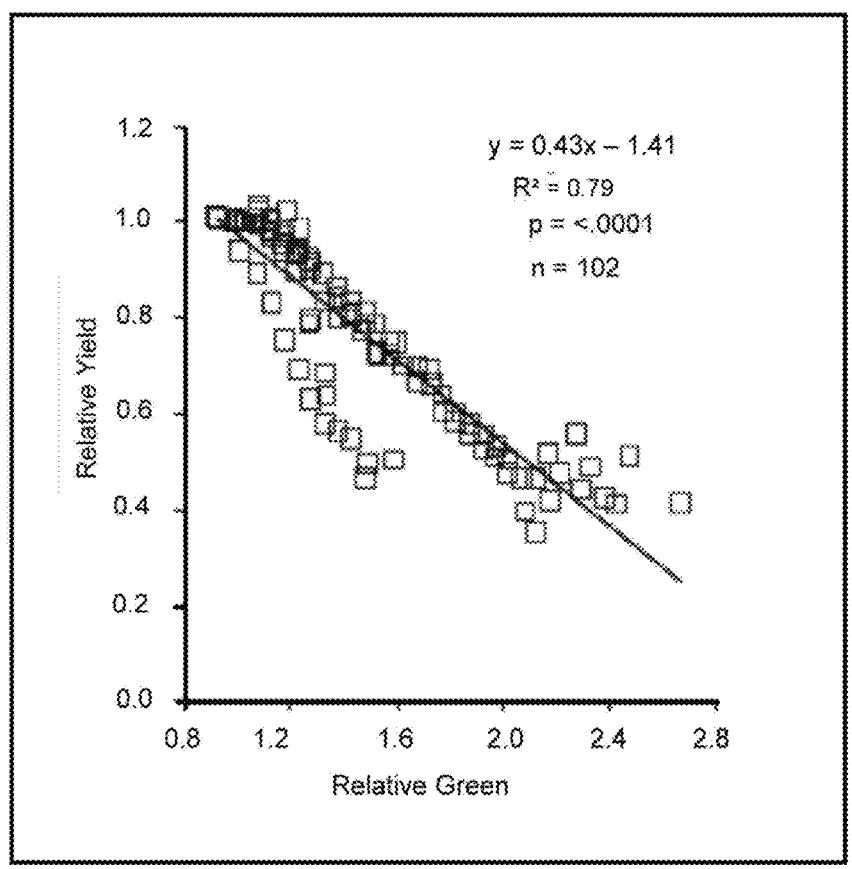
FIG. 3 illustrates the relationship between relative yield and relative green from combined data across all seven fields.

The present invention describes a method for determining nutrient deficiency and resulting crop yield loss using aerial photographs and positional data. In particular, the invention provides a method of determining yield loss due to nitrogen-deficiency using aerial photographs. In an aspect, the crop may be corn, rice, wheat, potatoes, grass, or cotton. In essence, the invention provides a method for estimating nitrogen deficiency in a field of crops, predicting the resulting loss of crop yield due to the nitrogen deficiency, and lastly providing information to help the producer to determine whether additional nitrogen fertilization would be economically profitable. A flowchart showing the steps of one embodiment of the present method is shown in FIG. 1, though some steps may be omitted.

Figure 12:
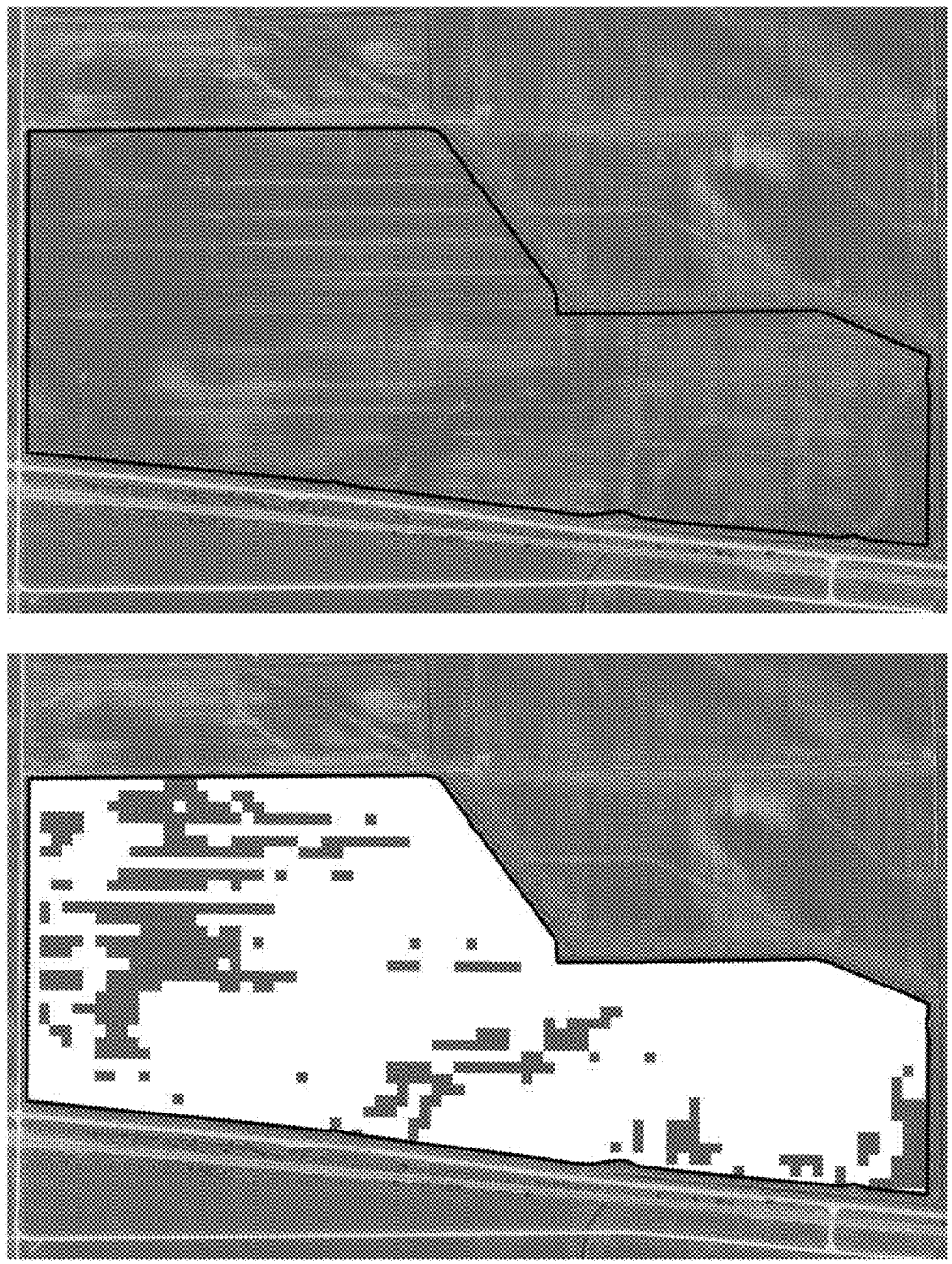
FIG. 12 shows an example of using the darkest pixels or polygons to establish the reference color. Only the darkest pixels or polygons in the field (bottom) are retained from the original image (top) to use in establishing the color of the crop with sufficient nitrogen (the reference color).

An aerial image or images are obtained of a field or fields of interest, either from an airplane, an unmanned aerial vehicle, a satellite, a buoyant vehicle, or a tower. The aerial image is subdivided into polygons, which may be individual pixels in the original image or aggregates of pixels. Within each polygon, the color intensity of all pixels is averaged to determine the mean color intensity for the polygon for a color chosen from red, blue, green, red-edge, near-infrared, or a combination index calculated from two or more of these colors. The reference color value ($C_{ref}$) for each field is then determined. This may be done by averaging the color intensities of polygons in a pre-established area with a high rate of N fertilizer, or by averaging the color intensities of the darkest polygons among all of the polygons in that field or a comparable nearby field (FIG. 12). Referring to FIG. 12, the wide range of color seen in this field is typical of fields where substantial nitrogen loss has occurred, leaving the areas with wetter soils deficient in nitrogen, resulting in plants with light green or yellow-green leaves. Partly-fertilized fields may also have a wide range of crop color, and this method can be used in that situation also. When using the darkest polygons in the field, the proportion of all polygons used in calculating $C_{ref}$ may vary with circumstances, but 20% will often be suitable in fully-fertilized fields that have lost N in wet weather. Once the field's $C_{ref}$ has been established, the Relative Color (RC) values of each pixel or polygon are obtained by quantitatively comparing the value of the color ($C_i$) of each pixel or polygon to $C_{ref}$. This may be done using division ($RC=C_i/C_{ref}$), subtraction ($RC=C_i-C_{ref}$), or some other method of quantitatively combining their values. An estimated yield loss is then calculated using a correlation of yield loss as a function of RC that was predetermined using previously measured empirical data. Lastly, the yield loss (YL) values for all polygons in the field are summarized in a meaningful way, which may include one or more of a yield loss map, field average yield loss, field total yield loss, field total dollar loss, or some other simple and meaningful summary of yield loss estimates over the whole field. An economic analysis can then be provided as to whether to add nitrogen to the field or a portion thereof, based on the price of the crop, the amount of crop lost, and the cost of nitrogen fertilization.

Acquisition and Processing of High Resolution Images of Fields

Remote sensing data may be collected using a variety of instruments selected from the list comprising aircraft mounted camera, unmanned aerial vehicle (UAV) mounted camera, helicopter mounted camera, satellite-mounted camera, camera mounted on a tower, and combinations thereof. In an aspect, the crop may be corn, rice, wheat, potatoes, grass, or cotton. For cornfields, the aerial image of one or more fields of interest may be acquired when the crop is between the stages V8 to V18, and more preferably between the stages V10 to V18. Growth stage V8 occurs about 4 weeks after the emergence of the corn from the soil; the corn plant at stage V8 has grown to approximately 50% of its full height. Growth stage V18 occurs when the corn plant has grown to its full height and just before the plant enters into the reproductive stage.

Optionally, the aerial image may be cropped to include only the one or more fields of interest with field boundaries and eliminating areas of high soil exposure identified by the operator or using automated image-processing rules defined below. In many cases, it is preferable to crop the image to include only one field, or two adjacent fields, and repeat as needed to analyze all fields of interest. However, if there is insufficient information to determine $C_{ref}$ or $I_{ref}$ during image analysis, such as the absence of a pre-established reference area, or alternatively a sufficient number of fields lack the minimum number of nitrogen-sufficient regions to serve as reference areas, then cropping the image to include multiple fields may be preferable in order to establish a reliable estimate of $C_{ref}$ or $I_{ref}$.

Field boundaries are defined in the aerial photos using methods selected from the list comprising: using stored files such as shape files, that define previously established field boundaries to define the current field boundaries; using such files from an existing public or private database; using an automated image analysis routine that uses image features to identify likely boundaries; and using an image analysis program to manually identify the field boundaries using a marking tool. Once the field boundaries are established, image pixels or polygons within the field boundaries are selected for analysis, and all other pixels falling outside the field boundaries are discarded. Many image-analysis programs, such as the Environment for Visualization of Images program (ENVI), possess tools to create image subsets, such as a Regions of Interest (ROI), based on the established field boundary lines.

The presence of bare soil in the aerial image may distort estimates of crop health and projected crop yield, so that the pixels corresponding to bare soil may be identified and removed using a number of techniques. A user may visually identify and manually remove the pixels corresponding to bare soil using existing image-processing software. Alternatively, the elimination of bare soil from the aerial image may be accomplished by discarding pixels meeting certain criteria, such as green/red ratio below a selected value, or normalized difference vegetative index below a selected value, or some other spectral property that is useful for distinguishing soil from plants. Suggested criteria for pixel/polygon removal include a green/red color ratio of less than 1.1, or a green/red color ratio that is less than 1.2 times the green/red color ratio measured from bare soil in the same image.

Determination of $C_{ref}$ and Calculation of Relative Color (RC)

The reference value of color corresponds to a section of field that is growing with ample available nitrogen ($C_{ref}$). This value is the benchmark for all color measurements, and all pixel/polygon measurements of color intensity are expressed relative to the reference value of the color selected from blue, red, red-edge, green, infrared, and color indices calculated from two or more of the preceding. $C_{ref}$ may be established by fertilizing a reference area of crop with a high rate of nitrogen early in the season, recording the area location, and identifying the area on the corresponding aerial image. $C_{ref}$ may also be calculated as the average color value of all pixels or polygons contained in the reference area. Alternatively, the color values of all pixels or polygons in the one or more fields of interest may be sorted from low (dark color) to high (light color), and $C_{ref}$ may be calculated as the mean or median color value of a group of the darkest pixels or polygons. One manifestation of this method is to calculate $C_{ref}$ as the mean or median color value of the darkest 20% (lowest color values) of all pixels or polygons, or $C_{ref}$ may be calculated as the mean or median color value of the pixels or polygons falling in the range between the darkest 10% and the darkest 20% of all pixels or polygons (lowest color values). Other methods could likely be used as long as a standard $C_{ref}$ is established.

Thus, for each field, the relative value of color (Relative Color or RC) of each pixel or polygon in the one or more aerial images is calculated by comparing the color value ($C_i$) of each pixel or polygon to $C_{ref}$. This may be done using division (RC=$C_i/C_{ref}$), subtraction (RC=$C_i-C_{ref}$), or some other method of quantitatively combining their values.

The method described by the present invention is employed to predict crop yield losses due to nitrogen-deficiency stemming from causes such as low nitrogen fertilization rate with no mid-season loss of nitrogen ("nitrogen-stress-without-nitrogen-loss"), or sufficient nitrogen fertilization early in the season with subsequent nitrogen loss caused by wet weather or other factors ("nitrogen-loss").

In an aspect, yield loss (YL), the predicted decrease in crop productivity (in bushels per acre or other measure of production per unit land area) due to nitrogen deficiency, may be estimated as a function of Relative Color (to include Relative Index, if used). In this aspect, the function may be linear or nonlinear.

In one aspect, yield loss may be calculated by substituting the Relative Color (RC) value or Relative Index (RI) value for each pixel or polygon of the Relative Color or Relative Index map into the linear relation:

$$YL = C_1 \times RC - C_2 \qquad \text{Eqn. (1),}$$

or $$YL = C_1 \times RI - C_2 \qquad \text{Eqn. (2),}$$

where $C_1$ is the slope and $C_2$ is the intercept of a linear fit of measured corn yield data (see Examples 1, 3, 4, and 9), and both $C_1$ and $C_2$ assume different values depending on a variety of factors including, but not limited to: the cause of the nitrogen-deficiency, the particular crop species, the color or colors used to develop the Relative Color or Relative Index Map.

Yield losses may be calculated for the areas represented by pixels, as well as or for larger areas created by aggregating pixels into polygons, and by aggregating polygons into fields. In the latter case, the yield loss of each polygon or field may be calculated by substituting the average of the RC or RI values of all pixels within the polygon or field into Eqn. 1 or Eqn. 2, or by averaging the yield losses calculated for all pixels in a polygon or field, or all polygons in a field.

Yield losses for each pixel or polygon may be mapped onto the aerial image by analog (using the same relative locations as the pixels/polygons from the image), or by using paired yield loss and spatial location values. If mapped by analog, total yield loss can be calculated by multiplying average yield loss (previous paragraph) by the known or measured area of the field. If mapped using spatial locations, average and total yield loss can be calculated using Geographic Information Systems software. The yield loss map, or alternatively, yield loss average or total for the field, or dollar loss calculated by multiplying yield loss by grain price, allows the producer to determine the economic penalty of allowing observed nitrogen deficiencies to continue, and balance this against the cost of fertilization. The map also, specifically, allows the producer to identify the location of any rescue nitrogen-fertilizations that may be required.

Determination and Mapping of Economically Optimal Nitrogen Fertilization Rate

In the case of sufficient nitrogen fertilization early in the season with subsequent nitrogen loss caused by wet weather or other factors ("nitrogen-loss"), it is unlikely that a reference area for nitrogen has been established by the producer. In this case, the disclosed process allows establishment of the reference color as, for example, the median of the darkest 20% of the pixels or polygons in the field or a comparable nearby field, as described in more detail above. This allows accurate determination of an economically optimal nitrogen rate (EONR) at each point in the field despite the lack of a reference area. Relative Color (RC) can then be calculated as described above, and EONR may be estimated as a function of Relative Color (to include Relative Index, if used). In this aspect, the function may be a linear or nonlinear function that describes a relationship such as the one shown in FIG. 11.

In an aspect where the relationship used to predict EONR takes a linear form, the generalized equation may be $EONR = C_3 \times RC - C_4$ (Eqn. 3), where $C_3$ is the slope and $C_4$ is the intercept of a linear fit of empirical data, using a method similar to the method used to determine the values of $C_1$ and $C_2$ (see Example 1). The empirical data used to establish the linear transformation in this aspect were collected from 23 small plot experiments in farmer fields in Missouri.

In addition, the EONR may be represented spatially, either by analog with the image, or by combining values with spatial location data for each pixel or polygon and thus used to construct an EONR map to provide a producer or other user with information on an estimated minimum amount of nitrogen fertilizer to use in the midseason application in order to minimize the predicted yield losses and recover the revenue that would have otherwise been lost due to a decrease in overall crop yield. Thus, the precise amount of additional nitrogen fertilizer needed to realize the maximum potential crop yield may be determined from the EONR map. This guidance may be used generally or by producing a computer file that can control a fertilizer applicator to apply the recommended rate at each point in the field, varying the rate as it crosses the field in response to crop color as seen in the aerial image. Other summary information, such as average EONR for the field, total fertilizer need for the field, and cost estimate for fertilizer plus application may also be used to help the producer make a sound decision about application of additional fertilizer.

The information contained in the yield loss map and the information contained in the EONR map may be combined to facilitate the management of nitrogen fertilizer. The total cost of additional nitrogen fertilization may be easily determined because the exact amount and location of fertilizer application is provided. Given additional information about the value of the crop, the economic loss incurred by yield loss if additional nitrogen fertilizer is not provided may also be determined. If the potential increase in the value of the harvest exceeds the expense of additional nitrogen fertilization, the producer would realize a net economic gain by fertilizing. In addition, because the information is provided as spatially mapped information, the producer is provided with the necessary information to perform a similar economic analysis on subsets or sub-regions of the crop field.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

EXAMPLES

The following examples illustrate the invention.

Example 1. Development of Method to Estimate Yield Losses from Aerial Photographs To develop and test a method to estimate corn yield loss due to nitrogen deficiency, the following experiment was conducted. Based on the hypothesis that the areas of cornfields experiencing higher nitrogen loss would appear lighter in aerial photographs and produce lower yields, aerial photographs of seven cornfields that had received above-average May and June rainfall were analyzed as described below.

Selection and characteristics of experimental fields: Seven study fields were located in four counties in the northern half of Missouri, spread over a distance of 270 km, and represented a moderate range of geographies, landscape positions, soil genesis factors, and surface soil textures (see Table 1). All seven fields had uniform fertilization histories. All fields were located in regions that received higher-than average precipitation in May and June, and therefore had a high potential for nitrogen losses due to leaching and denitrification losses. The fields used in this experiment were selected based on the determination of potential nitrogen deficiency by cooperating producers.

TABLE 1

Information on seven production cornfields photographed in 2001 and 2004.

| Field | Year | Soil region | Soil great group | Surface soil texture | Photo resolution (m/pixel) | Area (ha) | Polygon size ($m^2$) | Polygon count |
|---|---|---|---|---|---|---|---|---|
| AL1 | 2004 | Alluvial | Hapludolls* | Silty clay | 2.00 | 41.8 | 16 | 13899 |
| AL2 | 2004 | Alluvial | Endoaquerts* | Clay | 2.00 | 27.0 | 16 | 9686 |
| AL3 | 2001 | Alluvial | Endoaquolls* | Silty clay | 1.00 | 2.3 | 9 | 1562 |
| CP1 | 2001 | Claypan | Epiaqualfs | Silty loam | 0.54 | 7.4 | 10 | 5421 |
| CP2 | 2001 | Claypan | Albaqualfs | Silty loam | 0.56 | 6.3 | 21 | 1468 |
| CP3 | 2001 | Claypan | Epiaqualfs | Silty loam | 0.42 | 8.7 | 21 | 2103 |
| CP4 | 2001 | Claypan | Epiaqualfs | Silty loam | 0.42 | 5.6 | 21 | 1401 |

*All three alluvial fields contained map units representing more than one great group. The primary great group was listed and made up between 60% and 70% of the field area. Secondary great groups, by field, were: AL1, Endoaquerts; AL2, Hapludolls; AL3, Udifluvents.

Aerial photograph acquisition, digitization, and rectification: Aerial photographic images were acquired from five production cornfields in 2001 and two production cornfields in 2004. Aerial photographs in 2001 were taken from small-plane flyovers in a nadir (straight down) orientation at altitudes ranging from 1000-1400 m above ground level using ASA 400 35 mm color positive film. Larger fields were photographed from higher altitudes to fit the whole field onto the camera's field of view. Photos were obtained on 5 Jul. 2001, and the growth stage of the corn at that time was approximately V11 to V13. The film was processed into color slides, and then digitized using a Nikon CoolScan 1.05 film scanner (Nikon, Inc., Melville, N.Y.). The spatial resolution of the digitized images ranged from 0.42 to 1.00 m per pixel (see Table 1), depending on differences in the altitudes at which the aerial photographs were obtained and differences in the focal length used by the camera to obtain the aerial photographs. Using the Environment for Visualizing Images (ENVI) software version 3.5 (Research Systems, Inc., Boulder, Colo.), the aerial photos were rectified and formatted to the Universal Transverse Mercator coordinate system that incorporated the North American Datum of 1983 (NAD83), using coordinate points collected from Digital Ortho Quarter Quads produced by the U.S. Geological Survey and obtained from the map room of the Center for Agricultural, Resource, and Environmental Systems (http://cares.missouri.edu/index.asp). Georeferenced digital aerial photographic images for the two additional fields, acquired on 24 Jun. 2004 at an estimated corn growth stage of V10 to V11, were obtained from the National Agricultural Imaging Program (Farm Service Agency, U.S. Dept. of Agriculture). These additional aerial images had a spatial resolution of 2 m per pixel with 10 m stated accuracy.

Yield monitor data associated with image data: Maps of corn grain yield were obtained from the producers and processed using Spatial Management System Basic (Ag Leader Technology, Inc., Ames, Iowa). The location of each reported corn grain yield was used as the centroid for a rectangular polygon in the rectified aerial photographic images. "Closed" blanking (BLN) files, containing the coordinates of the vertices of the closed rectangular polygons, were constructed using Microsoft Excel (Microsoft Corp., Redmond, Wash.), imported as text files into Surfer 7.0 (Golden Software, Inc., Golden, Colo.), exported as shapefiles into ENVI 3.5, and used as Regions of Interest in the rectified images. The Regions of Interest were used to extract and export mean digital counts (DCs) for red, green, and blue wavelengths, as well as the associated geographic map coordinates for each polygon. Yield data and mean red, green, and blue DCs for each polygon were merged using SAS version 8.2 (SAS Institute, Cary, N.C.).

Aerial image processing: Several photographs contained areas of low vegetative cover, which were removed from the analysis to reduce errors in the appearance of the crop. All polygons with a green/red pixel color ratio of less than 1.2 were removed from the analysis, using a decision rule developed using previously acquired photographs of corn fields with high resolution (~4 cm) and low vegetative cover. Using this procedure, no polygons were eliminated from the A3 and CP2 fields. The CP3 and CP4 fields had 15% and 55% of the polygons removed, respectively, which were in areas identified by the cooperating corn producer as having severe black cutworm [*Agrotis ipsilon* (Hufnagel)] damage. The A1 and A2 fields had 17% and 15% of the polygons removed, respectively, mainly in areas identified by the cooperating corn producer as drainage channels. The CP1 field had 23% of the polygons removed, mainly at one end of the field that was identified by producers as suffering substantial stand loss due to excess rainfall and subsequent seedling disease.

Aerial Photographic Image Data Processing.

Figure 9:
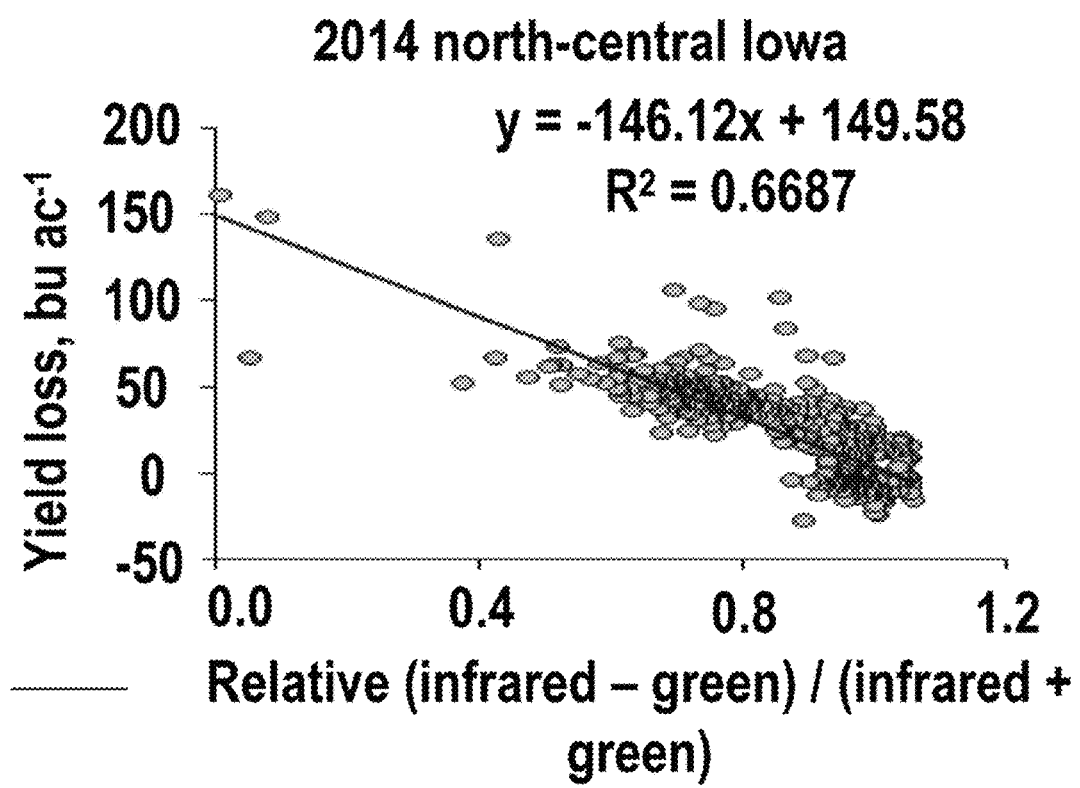
FIG. 9 is a graph showing crop yield loss as a function of relative index value for a combination index value of infrared and green for a plurality of crop fields, where the relative index value is calculated by dividing the observed index value by the reference index value.
Figure 10:
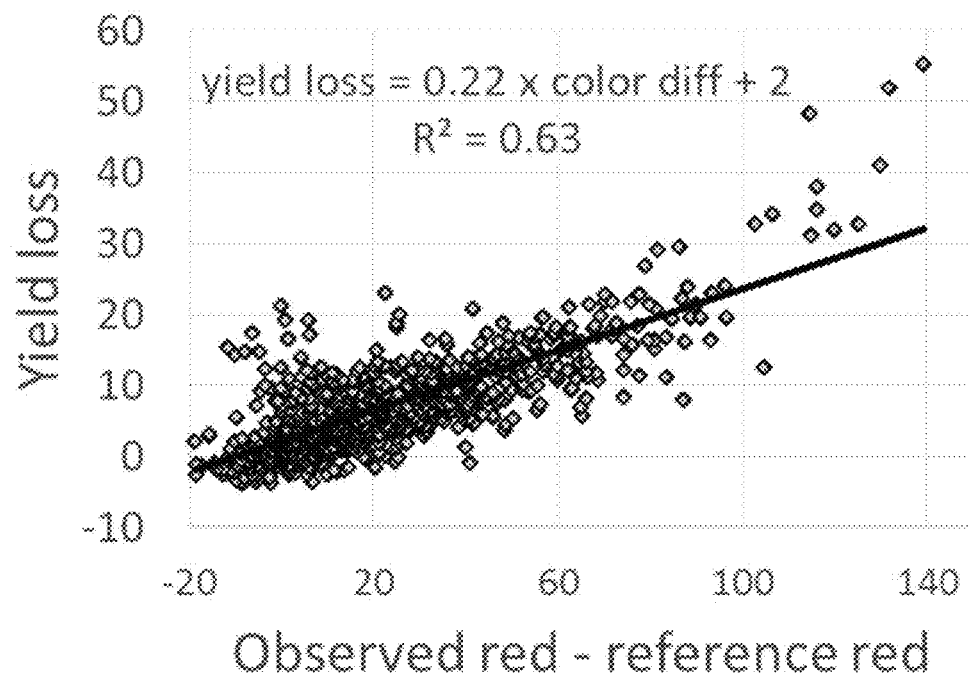
FIG. 10 is a graph showing crop yield loss as a function of relative red, where relative red is calculated as a difference between the observed red in an area and the reference red established from the darkest areas of the field.

In all fields, reference color, computed independently for red, green, and blue color bands, was defined as the mean value from the darkest 20% of polygons, and represented those areas with sufficient availability of nitrogen (FIG. 12). Relative color for each polygon was defined either as the color value of the polygon ($C_i$) divided by the reference color ($C_{ref}$) (FIGS. 2-5, 7-9, and 11) or the color of the polygon minus the reference color (FIG. 10).

In order to calculate yield loss, a reference yield value for each field was used to define the potential yield for the field with sufficient nitrogen supply for the plants. Reference yield was defined as the average yield for the same polygons (i.e. the darkest 20%) used in establishing the reference color value. The relative yield for each polygon was calculated by dividing each polygon's yield by the reference yield, and yield loss was calculated by subtracting the reported yield for each polygon from the reference yield.

For FIGS. 2-5, polygons in each digitized aerial image were grouped by relative green value into classes with a constant interval of relative green value (<1.00, 1.01 to 1.05, 1.06 to 1.10, 1.11 to 1.15, 1.16 to 1.20, etc.). All data associated with each polygon were aggregated into each of the classes, and mean values for relative green, relative yield, and yield losses were calculated for each class. Class means for relative yield and yield loss were regressed against class means for relative green using SAS software version 8.2 (SAS Institute, Cary, N.C.).

Relationship between aerial photographic data and crop yield: In each of the seven study fields, relative yield decreased significantly (P<0.002 in each field) as relative green increased, shown in FIG. 2. This observation was consistent with the hypothesis that lighter areas (with higher green DC and relative green values) had experienced nitrogen loss, which subsequently limited corn yield. The strength of the relationship was related to the degree of nitrogen stress, as assessed by the observed range of either relative green or relative yield. Coefficient of determination ranged from 0.62 in the field with the least nitrogen stress to >0.9 in the three fields with the most nitrogen stress. Within each relative green class, there was often considerable variability in relative yield that could be attributed to other landscape and management factors. In aggregate, however, this variability did not mask the effects of nitrogen on yield potential, suggesting that nitrogen was a major factor limiting yields in these fields. The relationship between relative green and relative yield was similar among all fields, though the CP1 and CP4 fields had steeper slopes than other fields (P=0.011 and 0.0005, respectively, using a test for equality of slope between individual locations vs. all locations combined). The observed similarities between fields suggested that a general relationship, shown in FIG. 3, could be used to predict relative yield from future aerial photographs with reasonable accuracy and reliability ($r_2$=0.79).

Figure 4:
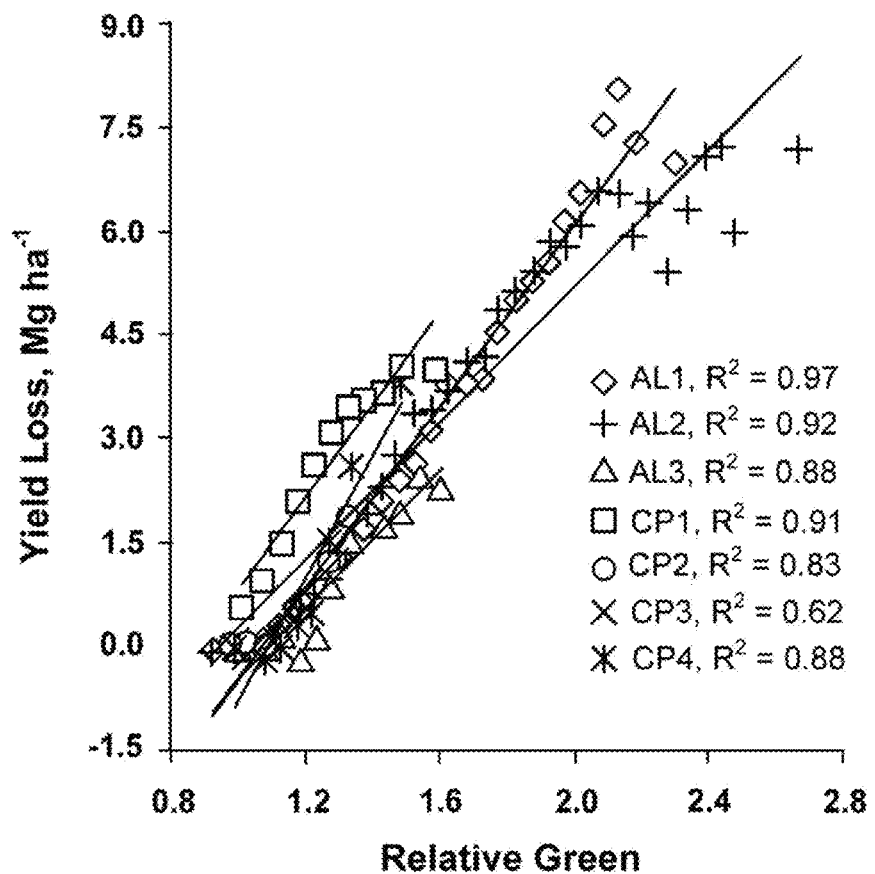
FIG. 4 illustrates the relationship between yield loss and relative green from individual fields.
Figure 5:
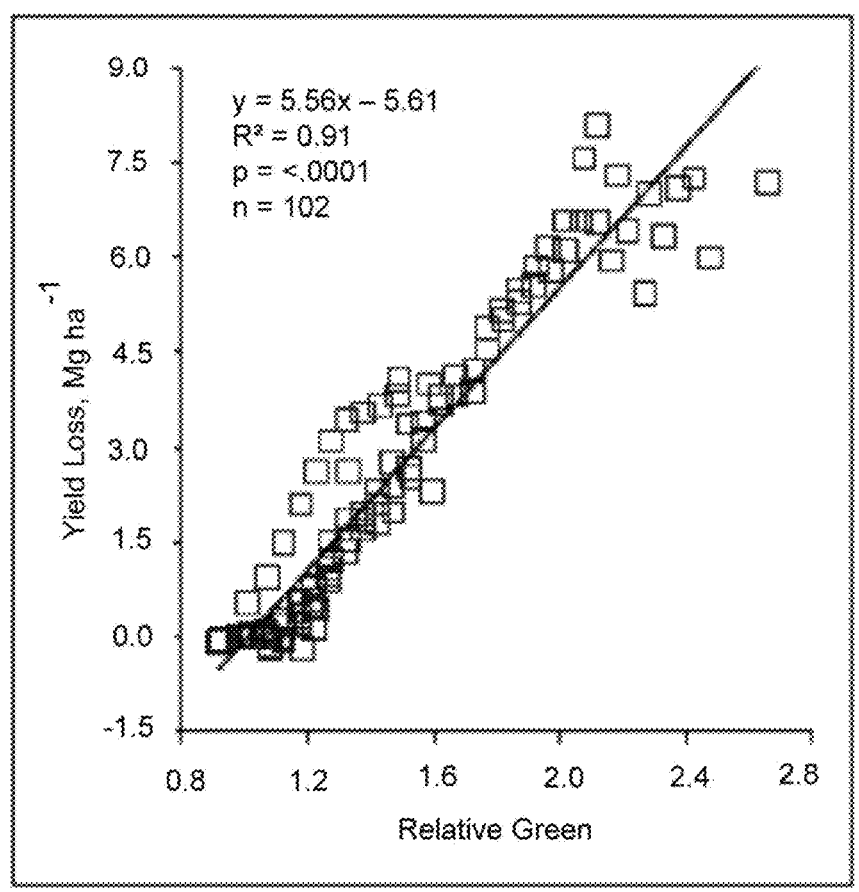
FIG. 5 illustrates the relationship between yield loss and relative green from combined data across seven fields.

Relative greenness was also related to yield loss in each study field, and summarized in FIG. 4 (P<0.002 in each field except CP3, where P=0.12). As with relative yield, coefficient of determination was lowest in the field with the least nitrogen stress and highest in the fields with the most nitrogen stress. The similarity of this relationship across fields was even more striking than for the relationship between relative greenness and relative yield. When data from all fields were combined to form a general relationship, as shown in FIG. 5, the coefficient of determination was 0.91, which suggested that potential yield loss can be estimated with good accuracy from aerial photographs for cases of nitrogen loss.

When data were standardized to reference values for each field and combined, relative green predicted relative yield with $r_2$=0.79 and yield loss with $r_2$=0.91. Aerial photos provided reasonable predictions of yield loss due to nitrogen deficiency. These predictions may help corn producers decide how much expense and trouble is justified in making rescue nitrogen applications, and additionally may permit large-scale evaluation of the susceptibility of different nitrogen fertilizer management strategies to address nitrogen loss.

Example 2: Aerial Photo Data Used to Manage Nitrogen Supplementation

Figure 6:
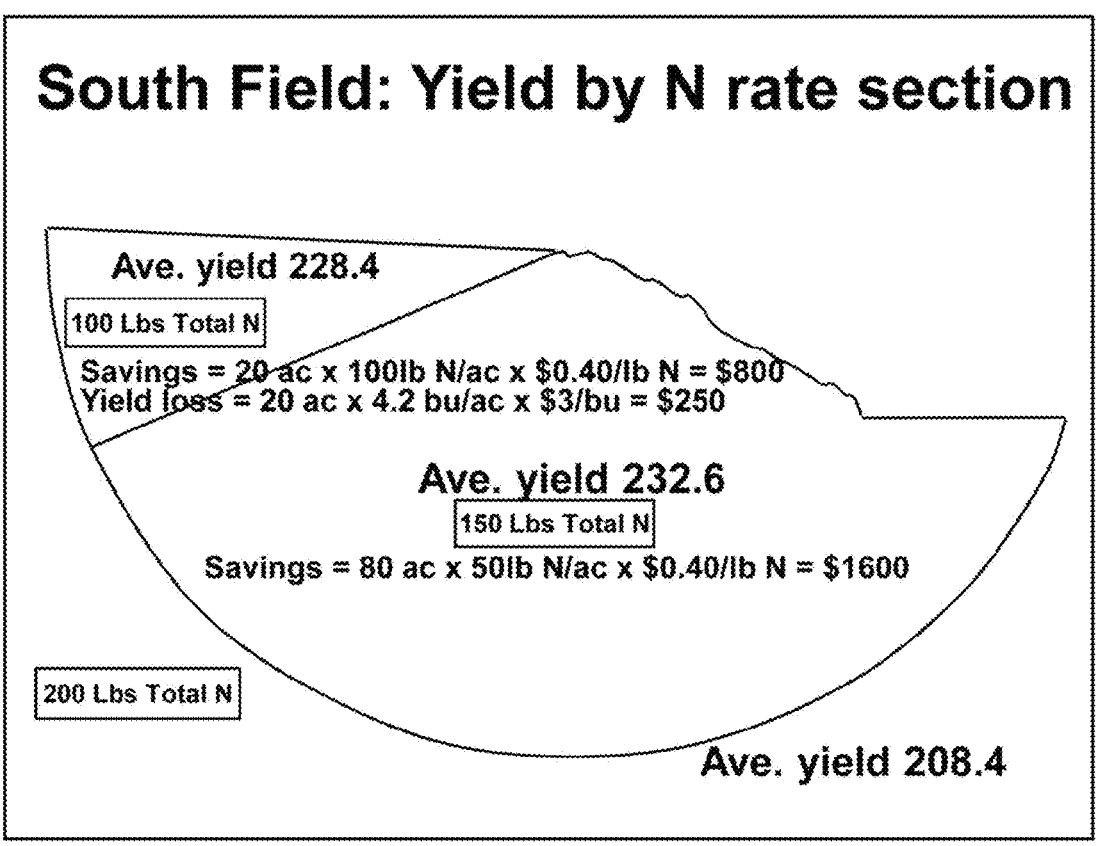
FIG. 6 is a summary of the crop yield resulting from nitrogen fertilization management informed by an assessment of crop nitrogen deficiency using aerial photographic data.

To demonstrate the feasibility of using aerial photo data to assess crop health and to determine the appropriate rates of nitrogen supplementation, a demonstration project was established in 2006. This project used data obtained from aerial photos using the methods described in Example 1 to guide nitrogen fertilizer application through a center-pivot irrigation system, as illustrated in FIG. 6. In this demonstration project, the normal pre-planting nitrogen application was reduced by 50%, and aerial photographs were used to diagnose the additional nitrogen application rate needed for 150 pivot-irrigated acres. Based on the fertilization rate determined by the methods described in Example 1, nitrogen fertilizer use was reduced by 8500 lb of nitrogen (28,000 lb nitrogen fertilizer solution), or 28% of the normal nitrogen application rate. This recommended nitrogen fertilization rate resulted in a modest 84 bu loss in corn yield, or 0.25% of the field's total yield. Results from the south field of this demonstration project are shown in FIG. 6.

Example 3: Nitrogen Management Methods Using Aerial Photo Data May be Used to Manage Nitrogen Fertilization Rates on Experimental Survey Areas To refine the relationship between aerial photo data and corn yield loss developed using the methods described in Example 1, three experimental survey areas of 1200 to 2000 acres were established in the Missouri River bottom of Holt County, Missouri, which received excessive rainfall in April and May 2005. Based on the predictive relationship developed in Example 1, aerial photographs were used to predict an average of 25 bu/acre lost yield potential over the survey areas due to nitrogen deficiency. Extrapolated over the whole Missouri River bottom in Holt County, this amounted to 1.8 million bushels of lost corn yield in 2005, or about $3.6 million of lost income. Working with community agronomists and individual producers to collect nitrogen fertilizer management information for these fields, different nitrogen fertilizer sources and multiple application methods may be compared to determine which strategies are most successful at preventing nitrogen loss.

Figure 7:
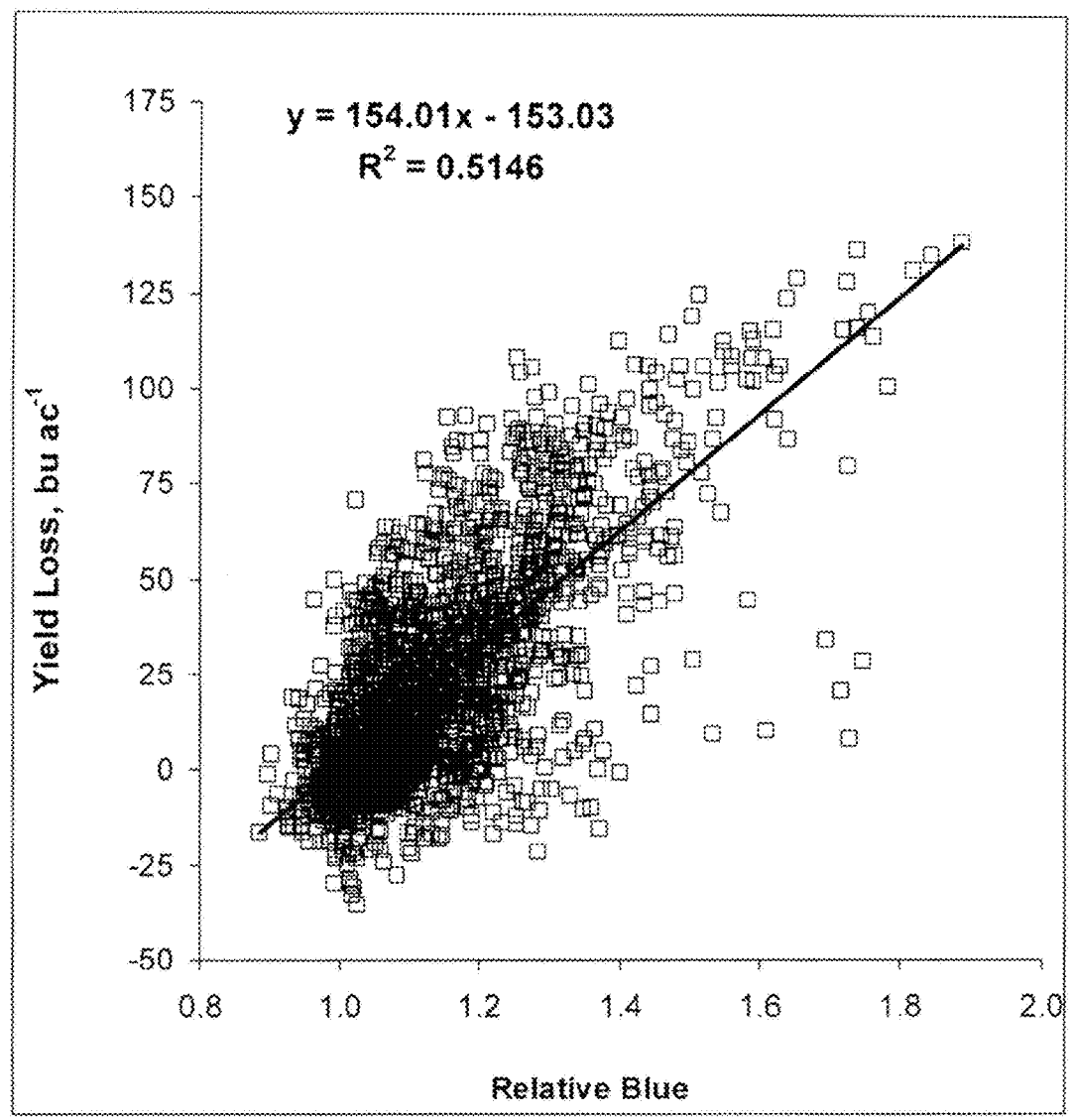
FIG. 7 is a graph summarizing the correlation of crop yield loss as a function of relative blue value for a plurality of crop fields.

Example 4. Estimating Yield Losses Using Relative Blue Measurements from Aerial Photographs Using the methods described in Example 1, with the exception that polygons were 20-meter squares, and no classes were used, a correlation between Yield Loss and Relative Blue values as measured from aerial photographs of six crop fields was developed. FIG. 7 is a summary of the correlation, which had a C1 of 154.01 and a C2 of 153.03. The results of this experiment demonstrated the feasibility of estimating Yield Loss using Relative Blue values as the Relative Color measurement from the aerial photographs of crop field.

Figure 8:
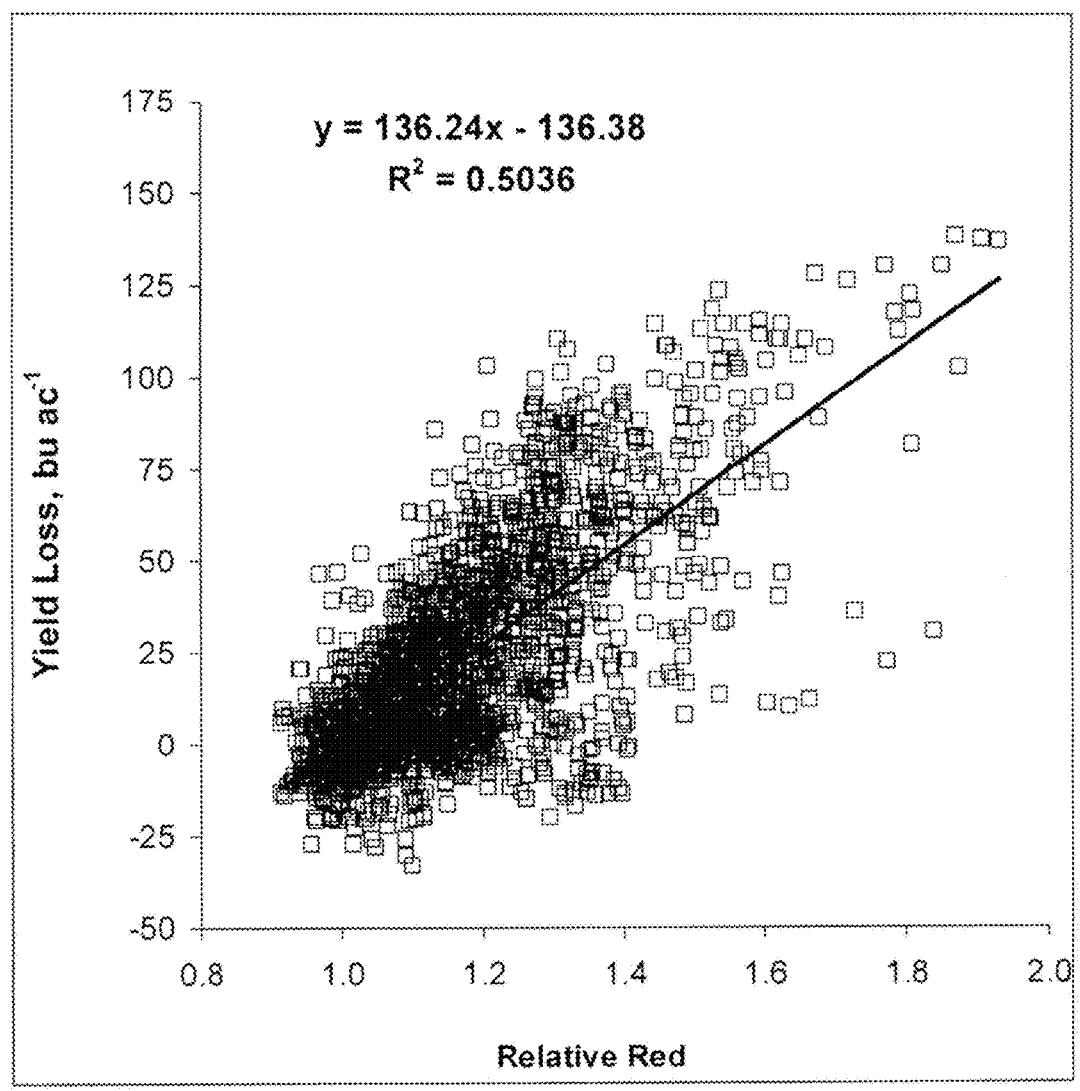
FIG. 8 is a graph summarizing the correlation of crop yield loss as a function of relative red value for a plurality of crop fields.

Example 5. Estimating Yield Losses Using Relative Red Measurements from Aerial Photographs Using the methods described in Example 1, with the exception that polygons were 20-meter squares, and no classes were used, a correlation between Yield Loss and Relative Red values as measured from aerial photographs of six crop fields was developed. FIG. 8 is a summary of the correlation, which had a C1 of 136.24 and a C2 of 136.38. The results of this experiment demonstrated the feasibility of estimating Yield Loss using Relative Red values as the Relative Color measurement from the aerial photographs of crop field.

Using the methods described in Example 1, with the exception that polygons were 20-meter squares, no classes were used, and Relative Red was calculated by subtraction (rather than division as in all other figures), a correlation between Yield Loss and Relative Red values as measured from aerial photographs of six crop fields was developed. FIG. 10 is a summary of the correlation. The results of this experiment demonstrated the feasibility of using Relative Color values calculated using subtraction, while all other figures with graphs demonstrate the feasibility of using Relative Color values calculated using division.

Example 6. Estimating Yield Losses Using Relative Index Measurements from Aerial Photographs Using the methods described in Example 1, with the exception that polygons were 20-meter squares, no classes were used, and aerial image and yield map were from a field in north-central Iowa in 2014, a correlation between Yield Loss and Relative Index values as measured from aerial photographs of crop fields was developed. FIG. 9 is a summary of the correlation, which had a C1 of 146.12 and a C2 of 149.58. In general, for each pixel, the combination index value was calculated using the formula: (infrared−green)/(infrared+green). All of the combination index values were sorted in the field and the median of the darkest 20% of polygons was set as the reference index value. For each pixel, the Relative Index value was calculated as Relative Index=combination index value for each pixel divided by the reference index value. A mathematical relationship was applied, such as the one shown in the graph of FIG. 9, to predict yield loss. The results of this experiment demonstrated the feasibility of estimating Yield Loss using Relative Index values as the measurement from the aerial photographs of crop field.

Figure 11:
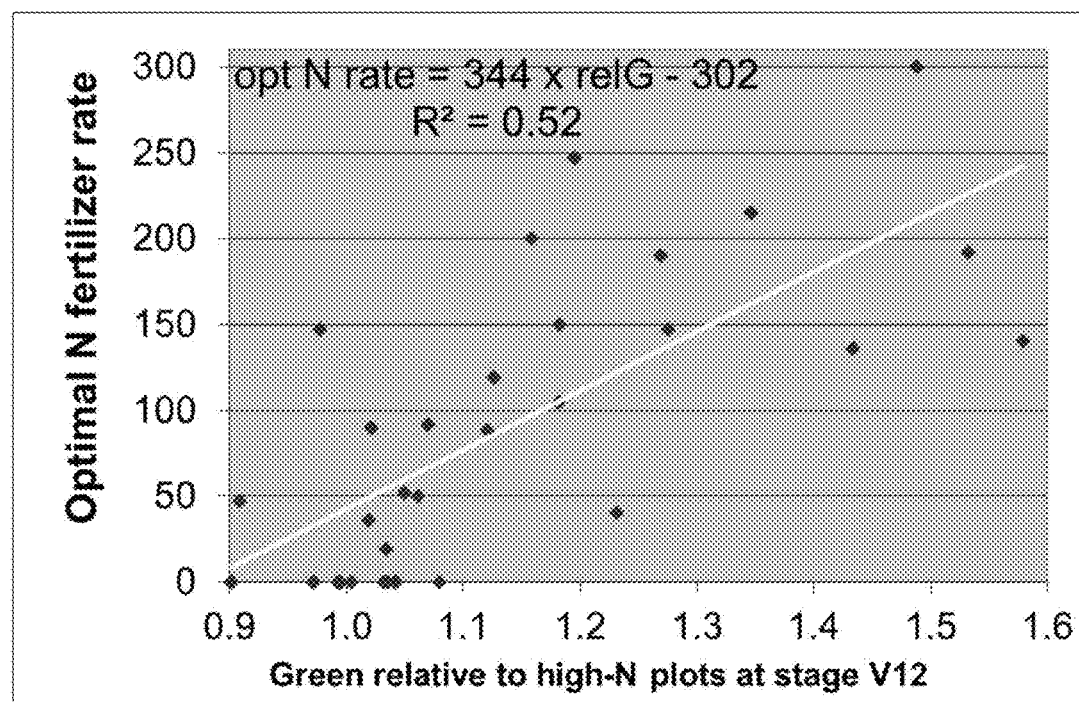
FIG. 11 is a graph showing the relationship between relative green, measured from aerial photos, and optimal nitrogen fertilizer rate measured across a large group of on-farm fertilizer rate experiments.

Example 7. Estimating Economically Optimal Nitrogen Rate Using Relative Color Measurements from Aerial Photographs Nitrogen fertilizer rates ranging from 0 to 300 pounds of N per acres were applied to pre-planned areas in 23 farmer fields. In each field, grain yield associated with each N rate was measured, and Economically Optimal N Rate (EONR) was calculated, that is, the N rate that made the most money. Aerial photographs were acquired 4 times during the growing season for most of these fields. Reference color for red, green, and blue for each field was set as the average color in aerial photos of all plots at and above the EONR; in most fields, this constituted 20% or more of the area. For each plot that had received either 0 or 100 pounds N per acre at planting, relative color for red, green, and blue was calculated by dividing the color intensity for that plot (Ci) by the reference color for that field (Cref). In each field, relative color was averaged for all plots receiving 0 N at planting for all three colors; similarly, relative color was averaged for all plots receiving 100 pounds N per acre at planting for all three colors. Relative color values and EONR values were grouped across fields by growth stage at the time the aerial photographs were acquired, using increments of two growth stages (that is, V6-V7, V8-V9, V10-V11, V12-V13, V14-V15). For each growth stage, EONR values were regressed against relative color values. For most stages and colors, relative color was able to predict EONR. FIG. 11 shows the example of predicting EONR at stages V12-V13 using relative green measured in aerial photos.

We claim:

1. A method for determining a crop yield loss due to nitrogen deficiency in at least one or more crop fields based on an analysis of at least one or more remote sensing images, the method comprising:
   a. obtaining the one or more remote sensing images of the one or more crop fields;
   b. calculating a color value for each pixel of the one or more remote sensing images or a polygon comprising an aggregation of pixels of the one or more remote sensing images, wherein the color value is an individual wavelength or a combination index value comprising at least two wavelengths;
   c. selecting a reference color value for the field that represents the color value of crop plants with sufficient nitrogen, to be the same wavelength or combination of wavelengths used in (b);
   d. calculating a relative color value of each pixel or polygon in the one or more remote sensing images by quantitatively comparing the color value from that pixel or polygon from (b) to the reference color value from (c);
   e. estimating a yield loss of each pixel or polygon from its relative color value using an empirically determined mathematical relationship between the two quantities; and
   f. presenting a summary of all yield loss estimates for the field,
      wherein the yield loss comprises a decrease in crop yield per land area of a crop.

2. The method of claim 1, wherein the color value and the reference color value are quantitatively compared by division or subtraction to produce the relative color value.

3. The method of claim 1, wherein the summary of yield loss is presented visually or numerically with averages, totals, or combinations of the yield loss estimate of each pixel or polygon.

4. The method of claim 3, wherein the summary of yield loss further includes the economic value of such loss.

5. The method of claim 1, wherein the reference color value is obtained from the darkest areas in the one or more crop fields being diagnosed or from comparable nearby fields.

6. The method of claim 5, wherein the darkest areas are selected from the group consisting of the darkest plants in the field, the darkest plants in an appropriate neighboring field, measuring the value in a reference area in which a high rate of nitrogen fertilizer has been applied, and combinations thereof.

7. The method of claim 1, wherein the crop is selected from the group comprising corn, rice, wheat, potatoes, grass, and cotton.

8. The method of claim 1, wherein the at least one or more remote sensing images is a digital image with a resolution ranging between about 0.01 meters per pixel and about 30 meters per pixel, wherein the digital image is chosen from aerial photographs, satellite photographs, photographs obtained by drones, and photographs obtained by tower mounted cameras.

9. The method of claim 1, further comprising:
   g. determining a cost of nitrogen fertilization of the crop at a recommended nitrogen application rate and a projected value of the yield loss of the crop; and
   h. applying nitrogen fertilizer at the recommended nitrogen application rate if the projected value of the yield loss of the crop exceeds the cost of nitrogen fertilization by at least 20%.

10. A method for determining a nitrogen fertilizer rate to alleviate crop nitrogen deficiency in one or more crop fields based on an analysis of one or more remote sensing images, the method comprising:
   a. obtaining the one or more remote sensing images of the one or more crop fields;
   b. calculating a color value for each pixel of the one or more remote sensing images or a polygon comprising an aggregation of pixels of the one or more remote sensing images, wherein the color value is an individual wavelength or a combination index value comprising at least two wavelengths;
   c. selecting a reference color value for the field that represents the color value of crop plants with sufficient nitrogen, to be the same wavelength or combination of wavelengths used in (b);
   d. calculating a relative color value of each pixel or polygon in the one or more remote sensing images by quantitatively comparing the color value from that pixel or polygon from (b) to the reference color value from (c);
   e. estimating a nitrogen fertilizer rate of each pixel or polygon from its relative color value using an empirically determined mathematical relationship between the two quantities; and
   f. presenting a summary of all nitrogen rate estimates for the field.

11. The method of claim 10, wherein the color value and the reference color value are quantitatively compared by division or subtraction to produce the relative color value.

12. The method of claim 10, wherein the summary of nitrogen rate estimates is presented visually, as a rate control file, or numerically with averages, totals, or combinations of the nitrogen rate estimate of each pixel or polygon.

13. The method of claim 12, wherein the summary of nitrogen rate estimates includes a comparison of the cost of the suggested nitrogen fertilizer treatment with the cost of the yield loss.

14. The method of claim 10, wherein the reference color value is obtained from the darkest areas in the one or more crop fields being diagnosed or from comparable nearby fields.

15. The method of claim 14, wherein the darkest areas are selected from the group consisting of the darkest plants in the field, the darkest plants in an appropriate neighboring field, measuring the value in a reference area in which a high rate of nitrogen fertilizer has been applied, and combinations thereof.

16. The method of claim 10, wherein the crop is selected from the group comprising corn, rice, wheat, potatoes, grass, and cotton.

17. The method of claim 10, wherein the at least one or more remote sensing images is a digital image with a resolution ranging between about 0.01 meters per pixel and about 30 meters per pixel, wherein the digital image is chosen from aerial photographs, satellite photographs, photographs obtained by drones, and photographs obtained by tower mounted cameras.

18. The method of claim 10, further comprising:
   g. determining a yield loss of the crop;
   h. determining a cost of nitrogen fertilization of the crop at the recommended nitrogen fertilizer rate and a projected value of the yield loss of the crop; and
   i. applying nitrogen fertilizer at the recommended nitrogen fertilizer rate if the projected value of the yield loss of the crop exceeds the cost of nitrogen fertilization by at least 20%.

\* \* \* \* \*